United States Patent [19]
Girvin, III

[11] Patent Number: 5,441,291
[45] Date of Patent: Aug. 15, 1995

[54] BICYCLE FRONT FORK SUSPENSION

[75] Inventor: Robert H. Girvin, III, Holliston, Mass.

[73] Assignee: Girvin, Inc., Woonsocket, R.I.

[21] Appl. No.: 124,342

[22] Filed: Sep. 20, 1993

[51] Int. Cl.⁶ .............................................. B62K 21/20
[52] U.S. Cl. .................................. 280/276; 280/275; 280/280; 267/293; 267/294
[58] Field of Search ................ 280/276, 275, 279, 280, 280/284; 267/293, 294, 141.1

[56] References Cited

U.S. PATENT DOCUMENTS

| | | | |
|---|---|---|---|
| 412,322 | 10/1889 | Copeland | 280/264 |
| 414,048 | 10/1889 | Hunter | 280/264 |
| 423,471 | 3/1890 | Easthope | 280/276 |
| 441,649 | 12/1890 | Dunlop | 280/275 |
| 468,643 | 2/1892 | Clement | 280/275 |
| 913,961 | 3/1909 | Levedahl | 280/276 |
| 946,143 | 1/1910 | Levedahl | 280/276 |
| 1,251,992 | 1/1918 | Drew | 280/276 |
| 1,605,680 | 11/1926 | Merkel | 280/276 |
| 5,193,832 | 3/1993 | Wilson et al. | 280/276 |
| 5,217,241 | 6/1993 | Girvin | 280/284 |

FOREIGN PATENT DOCUMENTS

| | | | |
|---|---|---|---|
| 0167880 | 2/1921 | United Kingdom | 280/276 |
| 0166065 | 7/1921 | United Kingdom | 280/276 |
| 0239848 | 8/1925 | United Kingdom | 280/276 |
| 0258141 | 9/1926 | United Kingdom | 280/276 |
| 0302026 | 7/1928 | United Kingdom | 280/276 |
| 0322370 | 12/1928 | United Kingdom | 280/276 |

OTHER PUBLICATIONS

"Mountain Bike Action", Feb. 1992.
"Mountain Bike Action", Mar. 1992.
"Mountain Bike Action", Mar. 1992.
"Mountain Bike Action", Oct. 1992.

Primary Examiner—Brian L. Johnson
Assistant Examiner—F. Zeender
Attorney, Agent, or Firm—Wolf, Greenfield & Sacks

[57] ABSTRACT

A front fork suspension for a bicycle provides a front fork having a pair of fork members with ends that support a front wheel therebetween. A handlebar stem assembly is rotatably mountable in a head tube of a bicycle frame. The stem assembly includes, at an upper end, a forwardly-extending handlebar-supporting portion, or stem, that is substantially transverse to an axis of the head tube. A lower linkage is provided having a first end that is pivotally mounted to a lower end of the stem and an opposing second end that is pivotally mounted to a first location on the front fork. An upper linkage is provided having a first end that is pivotally mounted to the handlebar-supporting portion and a second end that is pivotally mounted to a second location on the front fork. A compression spring is attached between the upper linkage and the lower linkage at an attachment point on the upper linkage located substantially at the first end thereof and an attachment point on the lower linkage located substantially between the first end and the second thereof. The upper linkage and the lower linkage are constructed so that the wheel-supporting ends of the front fork displace, in response to an applied force, along a curved path. An adjusting member can be provided to one of the linkages to vary the curved path, hence varying the suspension's ride characteristics.

19 Claims, 9 Drawing Sheets

BICYCLE FRONT FORK SUSPENSION

FIELD OF THE INVENTION

The present invention relates generally to a bicycle front fork suspension system and more particularly to a suspension system that accounts for a variety of different forces acting on the front wheel of the bicycle.

BACKGROUND OF THE INVENTION

Bicycle suspension systems have become increasingly popular. Suspension systems for both the front and rear wheels of bicycles are employed with increasing frequency particularly in off-road or "mountain" bicycle designs to enhance rider comfort when traveling over rough terrain.

A significant disadvantage of many prior art bicycle suspension systems is that their designs dictated a trade-off between comfort of ride over rough terrain and pedaling efficiency. Most bicycle suspensions, according to the prior art, are designed to absorb forces directed substantially perpendicularly relative to the ground. However, during hard pedaling, a rider exerts substantial forces in a downwardly directed direction. Thus, if the suspension's springs are aligned to absorb, primarily, perpendicularly-directed forces, then they also respond to downwardly-directed pedaling forces. A soft spring may provide maximum cushioning when traversing rough obstacles, but it will also cause the bicycle to bounce or "pogo", periodically, as the rider pedals. This bounce reduces controllability and wastes pedaling energy, making the bicycle less efficient and increasing rider fatigue. The only way to avoid pedal-induced-bounce in such prior art suspension systems is to increase the stiffness of the suspension springs. By increasing spring stiffness, however, the suspension system loses much of its cushioning effect when traversing rough terrain.

Applicant's U.S. Pat. No. 5,217,241, which is expressly incorporated herein by reference, discloses a bicycle suspension system that is particularly applicable to the rear wheel and that eliminates much of the trade-off between smooth ride and pedal, efficiency. By orienting the suspension elements so that deflection of the suspension system is more sensitive to terrain-induced impacts at times in which rough terrain is likely to be negotiated, and less sensitive to such impacts at times when hard pedaling is likely to occur, the need to trade ride comfort for efficiency is largely eliminated.

In view of the disadvantages of the prior art, it is therefore, an object of this invention to provide a bicycle suspension system for use with the front fork of a bicycle that reduces the need o trade riding comfort for pedaling efficiency. The suspension system according to this invention should be adjustable in view of differing ride requirements and should be durable, relatively easily constructed and safe to use.

SUMMARY OF THE INVENTION

A bicycle front fork suspension, according to one embodiment of this invention, provides a stem assembly having a steer tube and a handlebar-supporting member or "stem" extending forwardly of the steer tube. The stem is typically aligned substantially transversely to the steer tube. The steer tube is rotatably mounted in a head tube of a bicycle frame so that moving the handlebar located at the end of the stem causes the steer tube to rotate. The steer tube is interconnected by pivoting linkages to a front fork that, in this embodiment, comprises a pair of discrete fork members constructed to support a front wheel axle at lower free ends thereof. The front fork members are joined by shafts positioned therebetween that also act as pivot locations for ends of the links. According to a preferred embodiment, the fork is supported by a pair of upper links and a pair of lower links. The upper links are interconnected between an upper shaft on the fork and a bracket on the stem. The lower links are connected between a lower shaft on the fork and a lower end of the steer tube that extends below the bottom end of the head tube. The upper and lower links are free to pivot to enable the axle-supporting lower ends of the front fork members to displace along a predetermined curved path. A compression spring and shock absorber element is provided between the stem assembly and the lower links. The lower end of the shock absorber is pivotally mounted between the fork and the lower end of the stem steer tube on the lower links. The upper end of the spring and shock absorber element is tied to the upper linkage pivot point located on the stem. Each pair of links are attached adjacent each of the pair of fork members according to this embodiment. The pairs of links are tied so that they rotate synchronously by means of pivot tubes that also act as mounting points for the spring and shock absorber element.

The upper pivot point on each of the fork members includes a boss that receives an end of the shaft. The boss and the shaft are each constructed eccentrically so that rotation of the shaft relocates the pivot point of the upper linkage relative to the fork. The rotational position of the eccentric shaft can be fixed using adjustment screws that are exposed through outward facing open ends of the boss on each fork member.

Changing the rotational orientation of the shaft relative to the fork members changes the location of the fork member pivot points and, hence, alters the curved path of the axle ends of the fork members. As such, the response of the suspension system to an applied force can be varied. In this manner, the ride characteristics of the suspension system can be varied to suit different terrain characteristics, such that the suspension can be made more sensitive to smaller bumps and obstructions or, conversely, more resistant to pedal induced down forces.

The spring and shock absorber element according to this embodiment can comprise a series of cylindrical elastomeric springs that are encapsulated by frustoconical washers. The durometer of each spring in the series can be different to generate a dual-rate spring and improve damping characteristics. Likewise, the frustoconical walls of the washers can be positioned radially remote from the outside diameter of the elastomeric springs. In this manner, the springs can expand radially, due to compression, over a first predetermined distance, corresponding to a first spring rate and, subsequently, the springs expand at a second spring rate with the edges in contact with the frustoconical walls.

The suspension system according to this invention can include safety stops and deformable dampers to enable the rider to retain steering control in the event of severe impact and/or catastrophic failure of the suspension system. Additionally, the front fork members can comprise tubes having a D-shaped cross-section with a flat side, wherein the flat sides of each of the fork members opposes the other fork member's flat side. Such flat surfaces facilitate the mounting of brackets and suspension linkage components.

BRIEF DESCRIPTION OF THE DRAWINGS

The foregoing and other objects and advantages of the invention will become more clear with reference to the following detailed description of the preferred embodiments as illustrated by the drawings in which.

DETAILED DESCRIPTION OF THE PREFERRED EMBODIMENT

Figure 1:
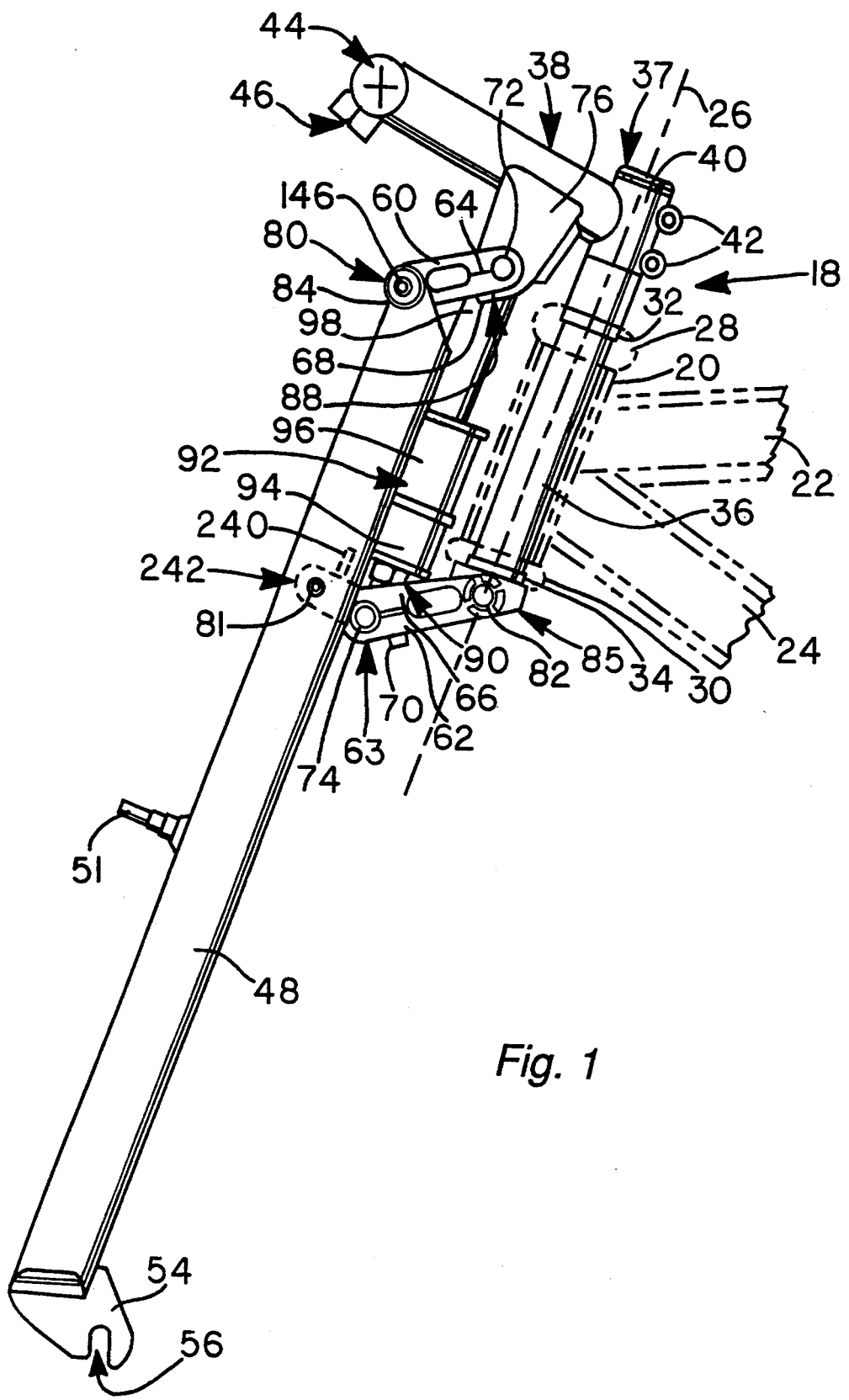
FIG. 1 is a side view of a bicycle front fork suspension according to this invention.
Figure 2:
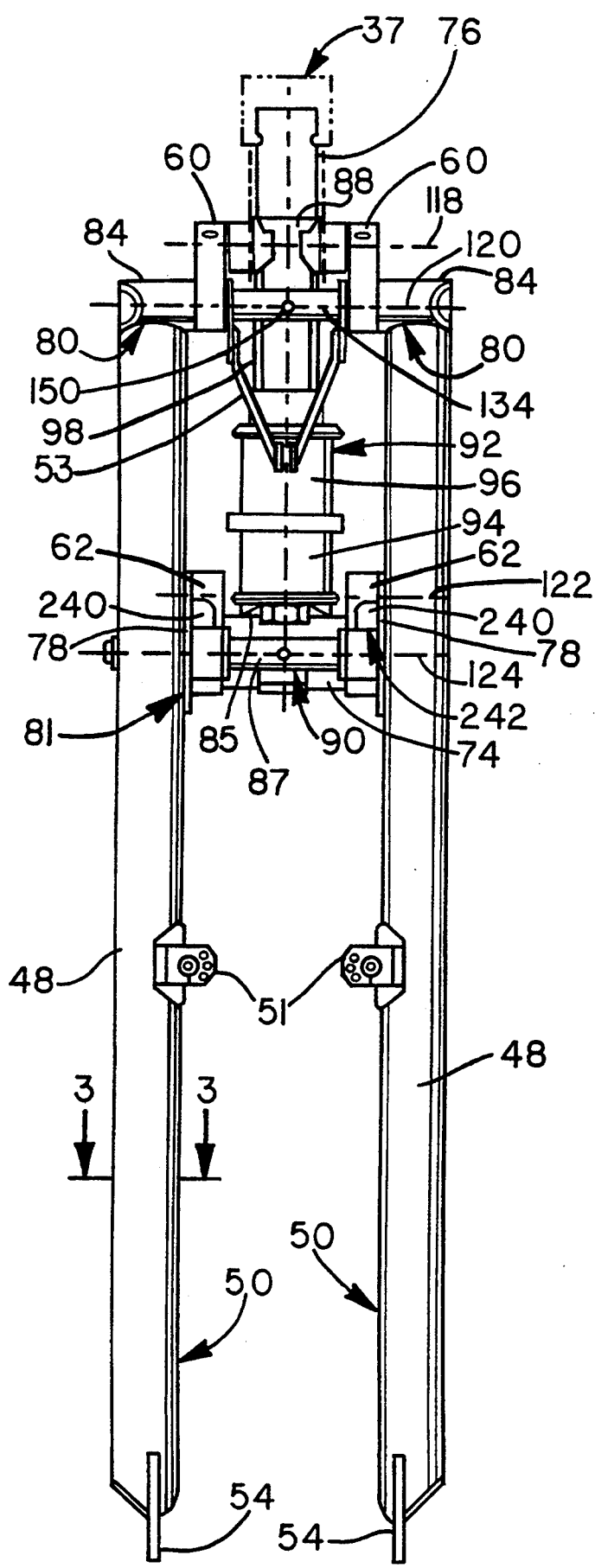
FIG. 2 is a front view of the suspension of FIG. 1.

FIGS. 1 and 2 detail a front fork bicycle suspension assembly 18 according to this invention. The suspension assembly 18 is located through a head tube 20 (shown in phantom) that is interconnected with a top tube 22 and a down tube 24 of substantially conventional bicycle frame design. The front fork suspension assembly 18 according to this invention can be adapted for use with a variety of different bicycle frame styles. In this embodiment, a "mountain bike" or off-road bicycle frame is contemplated. The suspension assembly 18 is rotatable about the axis 26 relative to the head tube, but is maintained against movement along the axis 26 by means of upper and lower bearings 28 and 30, respectively, that bear against shoulders 32 and 34 formed on the steer tube 36. The steer tube 36 is concentric with the head tube 20 and enables the front fork assembly 18 to rotate relative to the head tube to steer the front fork and its wheel (not shown) relative to the frame. The stem assembly 37 includes a forwardly-extending handlebar support 38, which is often termed the "stem", attached to the upper end of the steer tube 36. In this example, the support 38 includes a base 40 having a pair of clamping nuts 42 that close the base 40 around the steer tube 36 to retain it on the tube 36. The handlebar support or "stem" 38 is further detailed below. However, a variety of stem assemblies, handlebar supports and attachment mechanisms are contemplated according to this invention. A handlebar 44 is positioned at the outermost end of the stem 38 and is secured by a split clamp 46.

Figure 3:
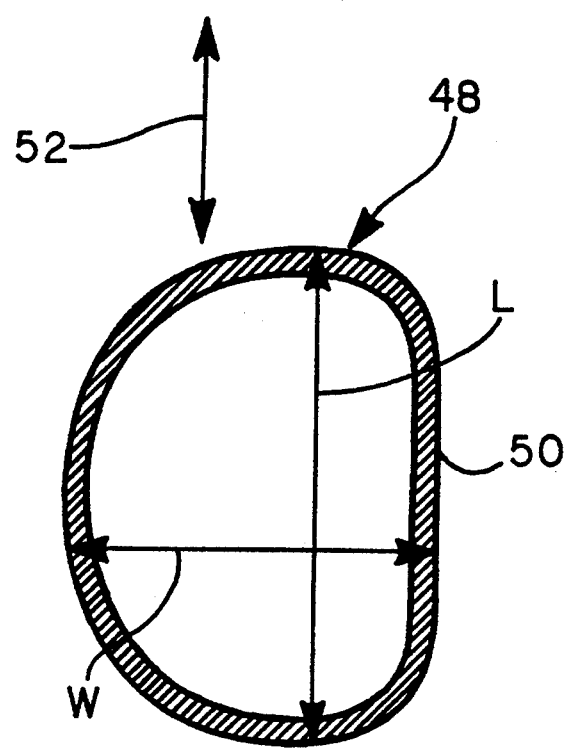
FIG. 3 is a cross-section of a fork member taken along the line 3—3 of FIG. 2.

From the stem 38 and steer tube 36 is mounted the movable front fork members 48 according to this invention. The front fork members 48 comprise hollow tubes constructed from 6061-T6 hardness aluminum according to this embodiment. However, other materials such as 7005 aluminum are contemplated for constructing the fork members 48. As further detailed in FIG. 3, each tube is shaped with a "D" cross-section wherein the inside edge (facing the opposing fork member 48) defines a flat side 50. The D-shaped cross-section enables easier mounting of pivot components on the flat side 50 and enhances strength along the forward to rearward direction (arrow 52) while increasing the spacing between fork members 48. Spacing is increased because the flattened side 50 eliminates the substantial inward extension that would occur with a round cross-section fork member. A D-shaped fork member can be formed, according to this embodiment, by pressing a round cross-section tube into the desired D-shape. Alternatively, the tubes can be formed into final shape by extrusion, wherein wall thicknesses can be varied about the cross-section to account for higher or lower stress concentrations. Upon formation, according to this embodiment, 0.065 inch thick tube is utilized. The maximum width L along the forward to rearward direction (arrow 52), according to this embodiment, is 1.5 inch while the maximum width W, perpendicular to arrow 52, is approximately 1.1-1.2 inch. Hence, these tubes are somewhat larger in diameter than some more conventional designs.

Each fork member 48 includes, at a bottom portion thereof, an axle mounting bracket 54 having a slot 56 for receiving a wheel axle. The brackets generally comprise flat sheet-stock material constructed from 6061-T6 aluminum according to this embodiment. The brackets 54 are welded to the bottom of the fork members 48.

Unlike many conventional designs, the fork members 48 are free of permanent interconnections between each other. In other words, there are no welded or soldered cross-members securing the fork members together. While it is possible to provide such members, the suspension structure according to this invention enables the construction of a solid and sturdy front fork without the use of weight-adding cross-members. The fork members, rather are tied together by pivot shafts 85 and 134 that are described further below. The fork members, however, still include relatively conventional brake pivots 51 and cable hangers 53 according to this embodiment that can be attached by screws, rivets or other suitable mechanisms.

Each of the front fork members 48 is supported from the steer tube 36 of the stem assembly 37 by pivoting upper and lower linkages that comprise one pair of upper links 60 and one pair of lower links 62, respectively. The links 60 and 62, according to this embodiment, are constructed from 6061-T6 aluminum. They each comprise pinch clamps having a split portion 64 and 66 along their midsections. A screw 68 and 70, respectively, is threaded through each split portion. The screw 68, 70 enables each link 60 and 62 to clamp tightly onto the respective pivot tube 72 and 74 passing therethrough.

In this embodiment, the upper link 60 is mounted to pivot tube 72 that extends through a bracket 76 on the stem support 38. The opposite end of each link 60 is attached to an upper pivot point 80 on each corresponding fork member 48. The lower pivot tube 74 is mounted along the lower link 62, adjacent a bend 63 in the link 62, between a pivot point 82 on the bottom of the steer tube 36 and a pivot point 81 on each fork member 48.

Each link 60 and 62 should clamp tightly enough around the respective pivot tube 72 and 74 so that the links do not rotate relative to the tube. The upper and lower pivot tubes 72 and 74, respectively can be constructed of 304 stainless steel tubing and include splines or other formations that interengage with opposing formations on the clamp portions of the links 60 and 62, respectively. As such, each of the links rotates an equal distance without slippage. This ensures that each link 60 and 62 in the respective pair of links remains in alignment, rotating as a single linkage; and, hence, the fork members 48 remain continually aligned as they move on their pivot points 80 and 81. The upper pivot point 80 is located in a boss 84 welded to the upper end of each of the fork members 48. Lower pivot point 81 comprises a shaft 87 that is mounted through each of the fork members 48 via brackets 78, riveted along the flat inner faces 50 of the members 48. The lower pivot point 82 is located on the lower end of the steer tube 36. A shaft 85 passes through the bottom of the steer tube 36 to retain the lower links 62 against the tube 36. The pivot points 80, 81 and 82 allow free rotation of the links 60 and 62 relative thereto. Note that the shafts 134 (described below) and 85 tie the discrete fork members 48 together according to this embodiment, as well as providing pivot points for the links 60 and 62.

Figure 5:
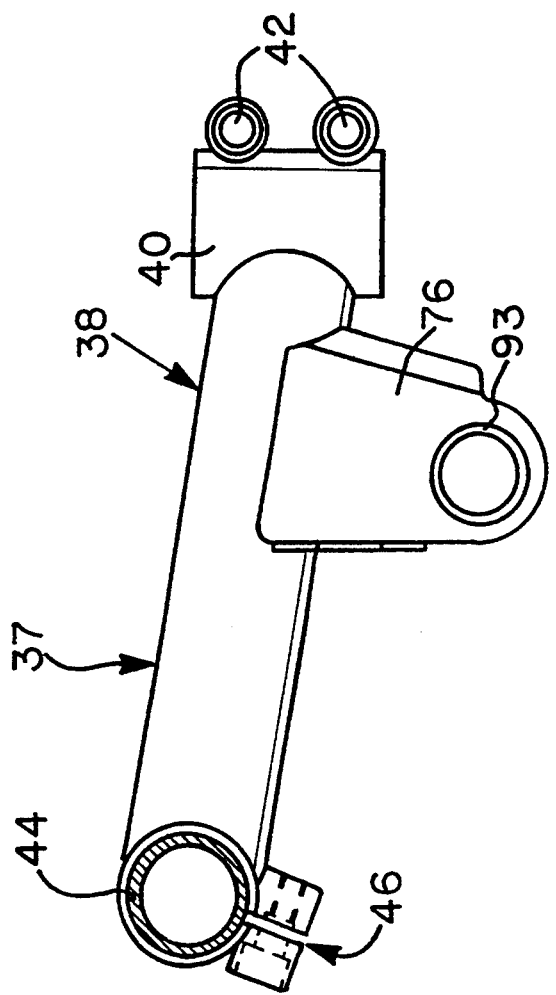
FIG. 5 is a side view of a handle bar stem according to one embodiment of this invention.
Figure 6:
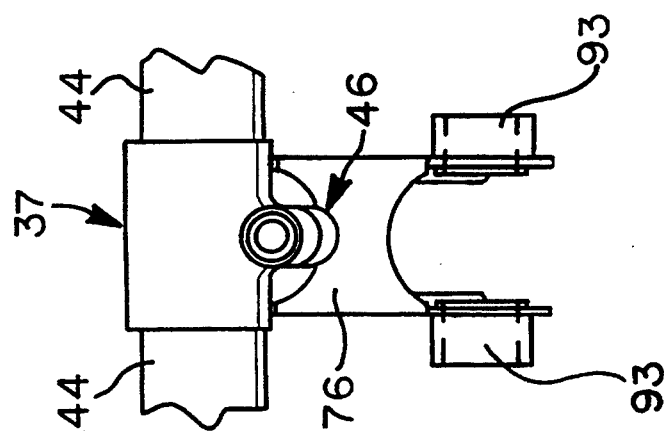
FIG. 6 is a front view of the handle bar stem of FIG. 5.

As described further below, the configuration of the links 60 and 62 and the spring/shock absorber element 92 are configured to provide a unique path of travel for the axle-carrying end of the fork members 48. According to this embodiment, the bicycle stem handlebar support 38, which is detailed further in FIGS. 5 and 6, includes a bracket 76 that supports one end of the upper link 60 and an upper end of the spring/shock absorber 92. The stem support 38 comprises a steel tube constructed, in this embodiment, of 4130 steel having an outside diameter of 1.125 inch and a wall thickness of 0.049 inch. The bracket 76 comprises a stamping formed of 4130 sheet steel that is joined to the stem support 38 by welding. The bracket includes a pair of bushings 93 that support the pivot tube 72 therein. Unlike many prior art designs, Applicant, according to this embodiment, locates a suspension mounting point directly on the handlebar support member of the stem. Mounting a suspension attachment point in substantial proximity to the handlebars 44 enhances rider control, particularly when traversing rough terrain. Transmitted forces from the suspension system are, thus, directed to the handlebars and can be countered, in part, by downward pressure exerted by the rider's arms. This configuration enables the rider to "feel" the road as he or she manipulates the handlebar. However, it is also contemplated that the joint of the upper link 60 can be located on the stem 37 closer to or on the tube 36 according to this invention.

As noted above, unlike many prior art suspensions. The large diameter tubular fork members 48, according to this invention, are tied directly by the upper links 60 to the stem 38. This arrangement provides relatively precise steering control and a minimum of intervening components between the wheel axle and stem 38.

The pivot tubes 72 and 74 also provide mounting locations for the upper and lower ends 88 and 90 of the spring and shock absorber element 92 according to this invention. The spring/shock absorber element 92 shall be detailed further below. In general, it comprises, according to this embodiment, a pair of cylindrical urethane springs 94 and 96 mounted on a central shaft that slides within an outer shock absorber tube 98. The spring/shock absorber element resists the displacement of the fork members 48 in a generally upward direction toward the stem support 38.

Figure 4:
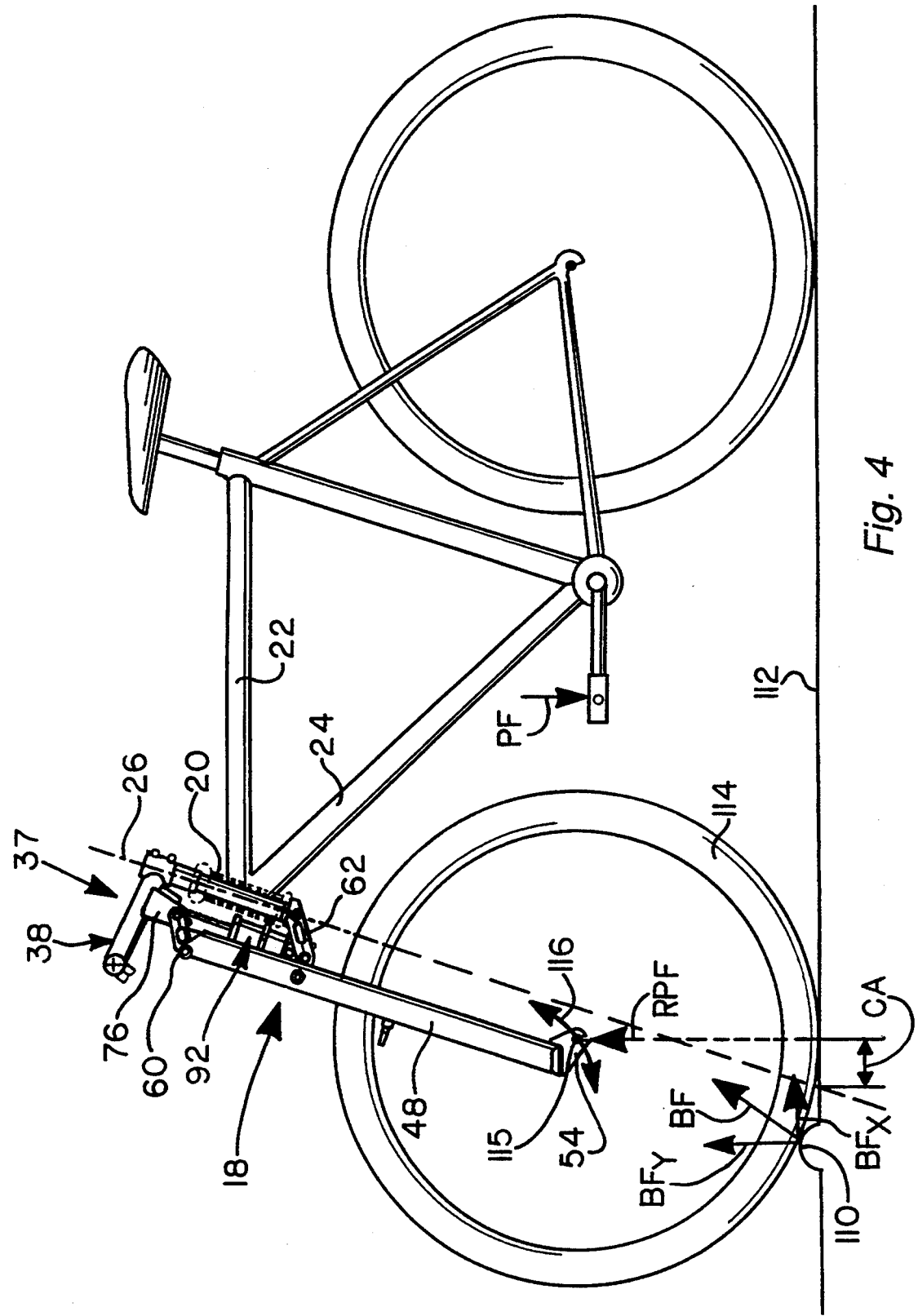
FIG. 4 is a somewhat schematic side view of a bicycle including the front fork suspension of FIG. 1 detailing displacement of the suspension due to contact with a bump or obstruction.

The dynamics of the suspension assembly 18 are further detailed in FIG. 4 wherein the forward-moving wheel 114 of a bicycle, shown schematically, is engaging a raised obstruction 110 located on an otherwise flat ground surface 112. As discussed above, hard pedaling generates a downward force PF on the bicycle frame. This force is countered by a resultant force RPF transmitted from the ground surface 112 into the fork members 48. In many conventional front fork suspension systems, the force RPF is resolved into direct displacement in the spring of the suspension causing a "pogo" effect in which the bicycle frame displaces downwardly during maximum pedal downward force causing an oscillating bouncing motion during pedaling. The front fork suspension assembly 18 according to this invention is designed to alleviate much of the "pogo" effect of pedaling.

Most obstructions, such as the raised obstruction 110, do not impart a straight upwardly acting force perpendicular to the ground surface 112. Rather, the geometry of most obstructions, in combination with the forward travel of the bicycle defines a rearwardly angled force BF that is nonvertical and not aligned with the pedal resultant force RPF. When the force BF is resolved into horizontal and vertical components, only a portion of the force $BF_Y$ is aligned vertically with RPF. The remaining force is aligned parallel to the ground 112 as shown by the component $BF_X$. Thus, by configuring the pivot locations and lengths of the links 60 and 62, as well as their spacing, to predetermined dimensions, a curved path of travel defined by the arrow 116 is achieved. The path of the curved arrow 116 is aligned more substantially along the direction of the force BF than along the vertical pedal resultant force RPF. In fact, the path, according to this invention, defines a somewhat J-shape in which the portion of the path associated with low fork displacement is more closely aligned with $BF_X$, while the portion of the path associated with greater fork displacement is more closely aligned with $BF_Y$. Accordingly, shock absorption and fork member displacement is less affected by pedal force during the initial stages of displacement and, rather, is more affected by horizontal components of force that are present upon initial engagement with an obstacle or obstruction.

In addition, the partially horizontal motion of the front fork member ends 54 according to this invention shorten the caster as illustrated by the distance CA. It is desirable to align the axle 115 of the wheel 114 more closely with the steering axis 26 to maintain positive control. The rearward movement of the fork member ends 54 ensures that such a realignment occurs at the critical moment of obstruction traversal when maximum control is desired.

With further reference to FIGS. 1 and 2 according to a preferred embodiment, the pivot axes 118 and 120 of the upper links 60 are preferably spaced 1⅝ inch apart. The pivot axes 122 and 124 of the lower links 62 are preferably spaced approximately 3⅛ inches apart (along a straight line therebetween). The axes 120 and 124 of the upper and lower pivot points 80 and 81 are preferably spaced 5 13/16 inches apart. The free length of the spring/shock absorber ends (from the center of pivot tube 72 to the center of pivot tube 74) is approximately 6 15/16 inches.

Varying the relative distances between pivot points and the spacing between pivot points along the fork members 48 alters the path of travel of the ends of the fork member. Hence, it is possible to change the ride characteristics of the front suspension assembly according to this invention.

Figure 7:
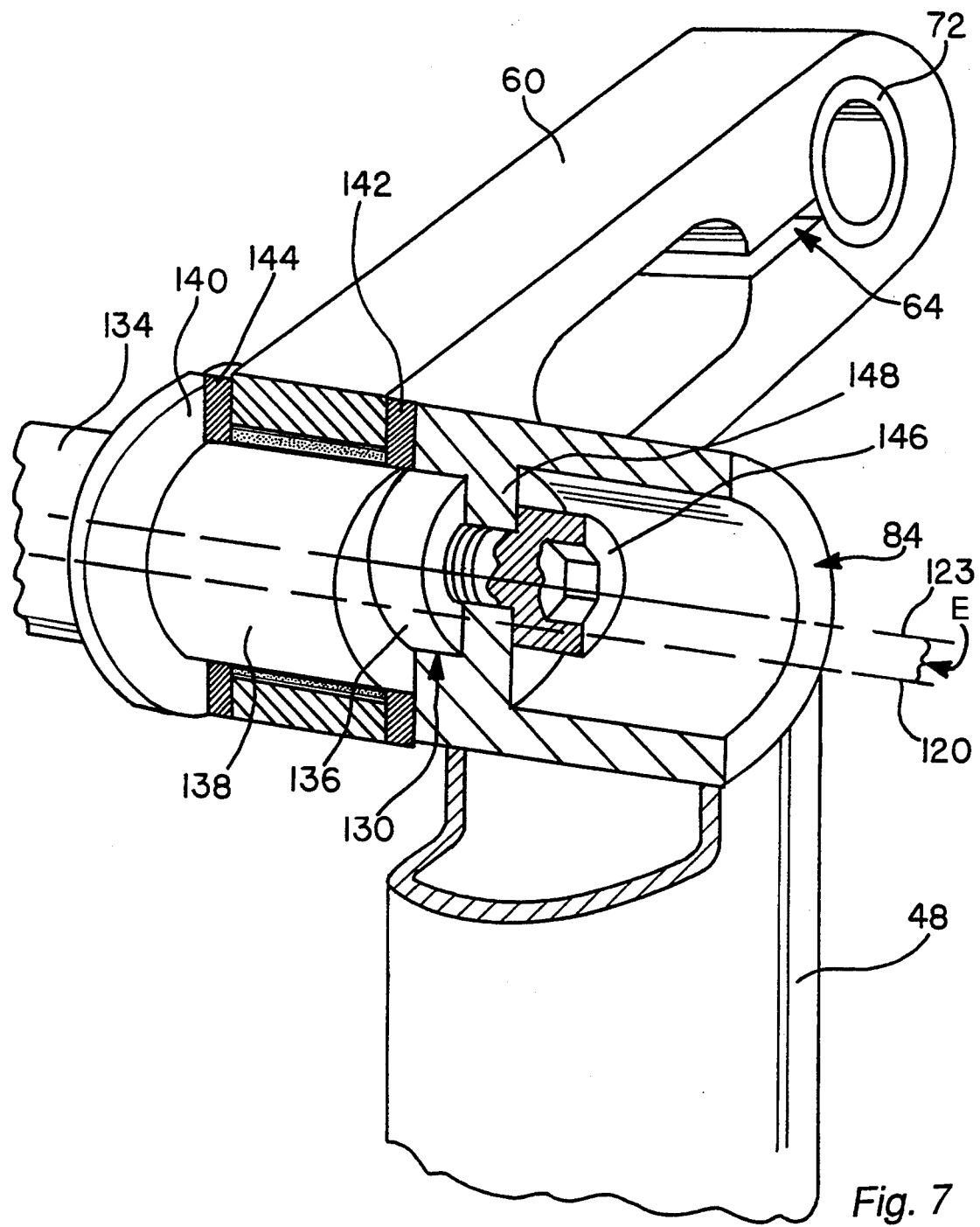
FIG. 7 is a more detailed cross-sectional perspective view of an upper pivot and link of the front fork suspension of FIG. 1 including an eccentric adjustment member.

FIG. 7 is a detailed view of the boss 84 mounted at the upper end of the fork member 48. An identical, but oppositely facing structure is located on the upper end of the opposing fork member 48. The boss 84 includes a hole 130 that is on the center axis 123 of the boss 84. Into the hole 130 is seated an eccentric cylinder 136 that is an extension of the shaft 134 adjacent a bearing portion 138 of the shaft 134. The bearing portion 138 is enclosed by the upper link 60. Note that the link 60 is separated from the boss 84 and a shoulder 140 of the shaft by a pair of spacers 142 and 144 that can comprise bronze, Delrin ® or other suitable metals or polymers with antifriction properties. The shaft 134 and bearing portion 138 define the pivot axis 120 about which the link 60 rotates. The eccentric cylinder 136 is disposed so that its center axis 123 (and that of boss 84) is offset by a distance E from the center (pivot) axis of the shaft 134. Hence, rotating the shaft changes the location of the link's pivot point (80) relative to the fork member 48.

The shaft 134 is rotationally secured relative to the boss 84 by a set screw 146 that bears against an inner wall 148 of the boss 84 and causes the extension 136 to become firmly engaged against the wall 148 upon tightening, thus preventing rotation relative to the hole 130. The set screw 146 comprises a hex head screw that, in this embodiment, is a metric M6×1 screw with a corresponding M6 hole tapped into the eccentric extension 136 of the shaft 134. However, a variety of attachment mechanisms are contemplated according to this invention that enable the extension to be rotated relative to the hole and secured in a desirable rotational position at a predetermined time. In this embodiment, the eccentricity, or distance E between the center axis 123 of the extension 136 and the shaft axis 120 is approximately 0.063 inch. However, it can be desirable to increase the eccentricity by up to, or more than, ¼ inch.

Figure 8:
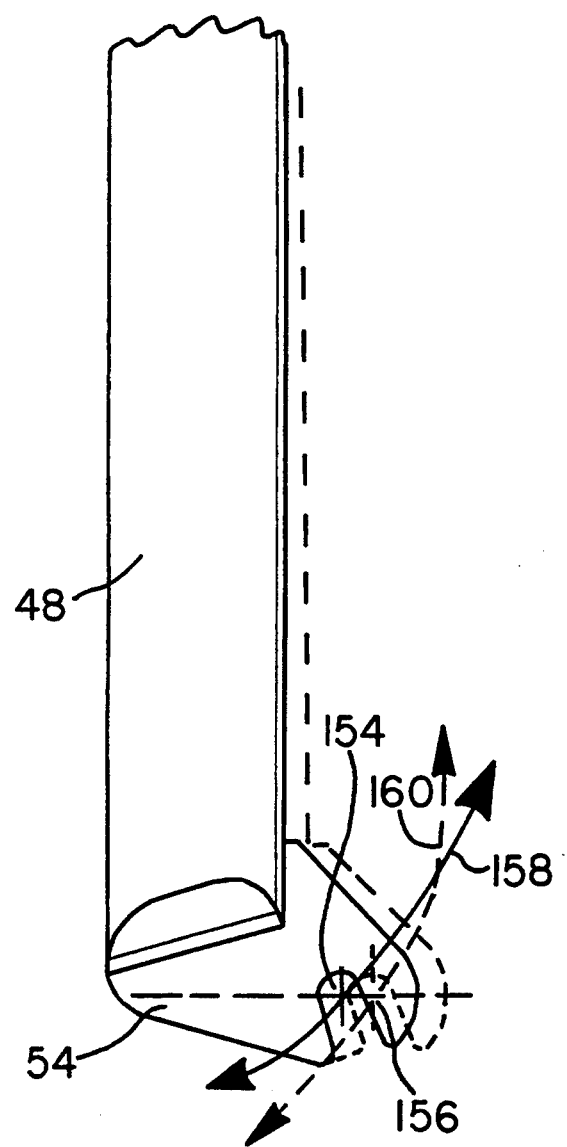
FIG. 8 is a partial side view of the wheel-carrying end of the front fork according to this invention, detailing the movement of the axle mounting point for each of two different adjustment positions.

A diametral hole 150 is also provided in the shaft 134 in order to facilitate rotation of the shaft relative to each of the bosses 84. By loosening the hex head screw 146 on each end of the shaft 134, and rotating of the shaft 134, the location of the pivot point 80 on each of the upper links 60 is varied. In particular, the distance between the upper pivot axis 120 and the lower pivot axis 124 on the fork members 48 is changed. This varies the resulting path of travel of the ends 54 of the fork members 48. Thus, as further detailed in FIG. 8, the wheel axle center 154 can be relocated as shown in phantom to the new axle position 156. This causes a corresponding change in the path of travel from the more J-shaped path 158 to a less J-shaped path 160 (shown in phantom). The initial displacement of the path 160 is also closer to vertical than the path 158 providing a greater initial response to vertically-directed forces. Thus, by rotating the shaft 134, the ride can be made more generally susceptible to vertically-directed forces (less J) or less generally susceptible to vertically-directed forces (more J).

Note that, in this embodiment, rotating the shaft 134 so that the pivot axes 120 and 124 are placed closer together causes more of a J-shaped path of travel (with a greater increase in an acute angle relative to the ground over a given displacement) while extending the distance between the two pivot axes 120 and 124 causes less of a J-shaped path of travel.

The ability to adjust the path of travel defined by the ends 54 of the fork members 48 allows the suspension system's sensitivity to vertical forces to be controlled. For example, when traversing very rough terrain, pedal speed is typically slow and the "pogo" effect is usually less pronounced than the jarring effect of the terrain. Accordingly, the fork can be adjusted to define less of a J-shaped path of travel during displacement so that it is more responsive to vertically directed impact force. However, where the rider travels at high speed along flatter surfaces, or up steep grades, the suspension system can be set to define a greater J-shaped path to prevent the "pogo" effect. It is assumed that in these circumstances, the "pogo" effect will be more pronounced than the effect of forces induced by contact with obstructions. Where mixed terrain is encountered, the eccentricity of the shaft 134 can be located between the two extreme settings to provide a compromise between shock absorption and "pogo" effect.

Figure 9:
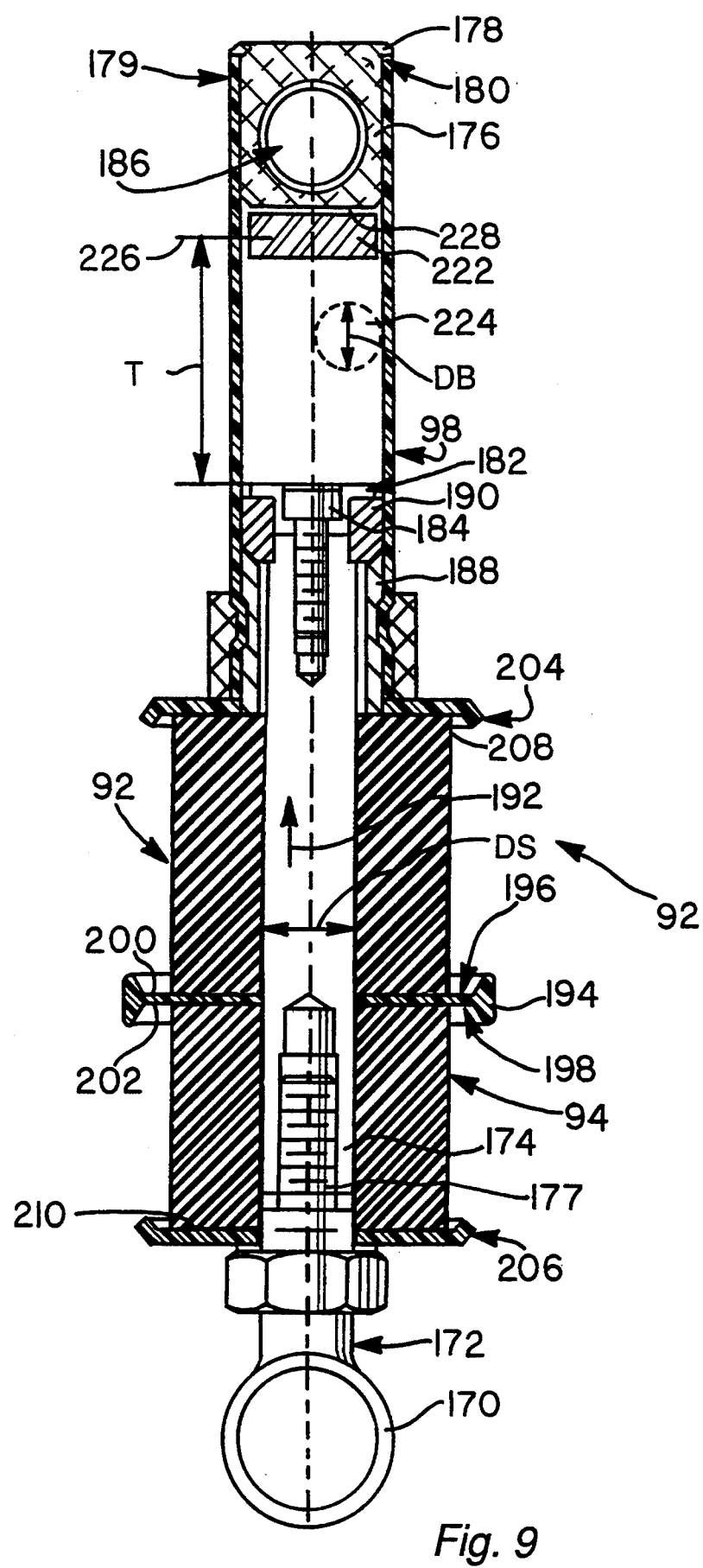
FIG. 9 is a cross-section of the spring and shock absorber element according to one embodiment of this invention.

FIG. 9 illustrates the spring/shock absorber element 92 for use with the front fork suspension 18 according to this embodiment. A variety of shock absorbers structures are contemplated for use with this system, however, including mechanical coil springs and separate spring/damper units.

As discussed above, the spring/shock absorber element 92 is mounted between the upper and lower pivot tubes 72 and 74 (See FIG. 1), respectively. The shock absorber is free to rotate on each of the tubes. A lower bushing 170 engages the lower pivot tube 74. This bushing is formed as part of an end piece 172 that is joined into an end of the shock absorber shaft 174 by a threaded screw end 177. An opposing bushing 176 is provided at the free end 179 of the outer tube 98 of the shock absorber 92. The bushing 176 comprises an insert having a shoulder 178 that engages the outer edge 180 of the shock absorber tube 98. The bushing 176 is typically sized so that it is easily removable from the shock absorber tube 98. This enables the user to access an end cap 182 at the upper end of the shock absorber shaft 174. The end cap is held in place by a set screw 184 that is accessed through the top end 180 of the shock absorber tube 98. The shock absorber tube 98 includes a hole (not shown) that is aligned with the hole 186 in the bushing 176. The upper pivot tube 72 passes through the hole in the shock absorber tube 98 and also through the hole 186 in the bushing 176. The pivot tube 72, thus, retains the bushing 176 relative to the shock absorber tube 98. The end cap 182 includes an annular elastomeric spring 190 that engages shoulders 188 located in the lower end of the shock absorber tube 98 and that prevents further separation of the shaft 174 from the tube 98 and that cushions downward limit travel of the shaft 174. The elastomeric spring can comprise polyurethane, rubber or other suitable spring materials. The end cap 182 retains the annular elastomeric spring 190 relative to the shaft 174. The shoulders 188 prevent the shaft 174 from extending downwardly away from the tube beyond a predetermined distance.

As discussed above, spring force and shock absorption is provided by a pair of cylindrical urethane or "springs" 92 and 94 according to this embodiment. While polyurethane microcellular foam is a preferred spring material according to this embodiment, a variety of similar elastomeric materials having spring and damping characteristics can be utilized according to this invention. In this embodiment, the springs 92 and 94 define cylinders each having an outer diameter of approximately 1.5 inch. The upper spring 92 has a free length of approximately 1.75 inch and an inner diameter of approximately 0.38 inch while the lower spring 94 has a free length of approximately 1.44 inch and an inner diameter of approximately 0.42 inch. It should be noted that the shaft 174 has an outer diameter DS of approximately 0.50 inch. Hence, the inner diameter of each of the springs 92 and 94 is smaller than the outer diameter DS of the shaft. As such, the springs must be deformed radially outwardly to be located over the shaft 174. This radial deformation induces a hoop stress in the springs that generates substantial damping friction as the shaft is displaced (arrow 192) to compress the springs. The springs 92 and 94 according to this embodiment provide a dual rate of compression. In other words, the lower spring 94 is somewhat softer and provides less friction damping (due to its larger inner diameter relative to the shaft 174) than the upper spring 92.

In this embodiment, the lower spring 94 is constructed of material having durometer of approximately 38, while the upper spring 92 comprises a material having a durometer of approximately 40. Thus, the springs have different spring constants in which the lower spring 94 tends to compress more easily and rapidly, with less damping, than the upper spring 92. A dual spring rate is achieved since the lower spring 94 compresses more easily, which is desirable when traversing small bumps, while large bumps cause a more substantial compression force that displaces the stiffer, more highly damped, upper spring 92. Note that the smaller inner diameter of the upper spring 92 generates greater damping than the lower spring 94. Such damping is desirable for absorbing impacts due to larger bumps or obstructions. This damping enables upper spring 92 to act primarily as a damper during the initial compression of the softer lower spring 94 as the shaft 174 slides relative to the upper spring 95.

The springs 92 and 94 are separated by a central washer 194. This washer is constructed, according to this embodiment, of ABS plastic and includes a pair of frustoconical surfaces 196 and 198 that face each of the springs 92 and 94, respectively. The frustoconical surfaces 196 and 198 each include a respective flat face 200 and 202 against which are respective end of the washers 92 and 94 are disposed. A pair of end washers 204 and 206 are also provided on the upper and lower ends of the spring pair 92 and 94. The end washers 204 and 206 are constructed, according to this embodiment, of 6061 aluminum strampings and also include frustoconical shapes that face inwardly toward their respective washers 92 and 94. The end washers 204 and 206 each include a respective flat surface 208 and 210 that bears against an end of respective spring 92 and 94. The flat surfaces 200 and 202 of the central washer 194 and the flat surfaces 208 and 210 of the end washers 204 and 206 each have a diameter of approximately 1.63 inch according to this embodiment. Thus, the diameter of each of the flat surfaces 200, 202, 208 and 210 is greater than the outer diameter of the springs 92 and 94 (approximately 1.5 inch).

As discussed generally in Applicant's above-recited U.S. Pat. No. 5,217,241, which discloses a similar spring structure for a rear suspension system, upon compression, the springs 92 and 94 tend to expand radially along the flat surfaces 200, 202, 208 and 210. Since the frustoconical walls of the washers (which, in this embodiment, are 45° relative to the flat surfaces) are radially spaced from the uncompressed springs 92 and 94, the springs are free to radially expand for a predetermined distance, upon compression, before contacting the walls. This first stage of compression, prior to contact with the walls, comprises a first discrete spring rate. Once the walls are contacted, however, the frustoconical walls resist further free radial expansion of the springs 92 and 94 and generate a second higher spring rate. Thus, for smaller impact forces, a lower spring rate is provided and the suspension is more responsive. For higher force impacts, however, a greater compression of the springs occurs which causes the springs 92 and 94 to contact the frustoconical walls.

Figure 10:
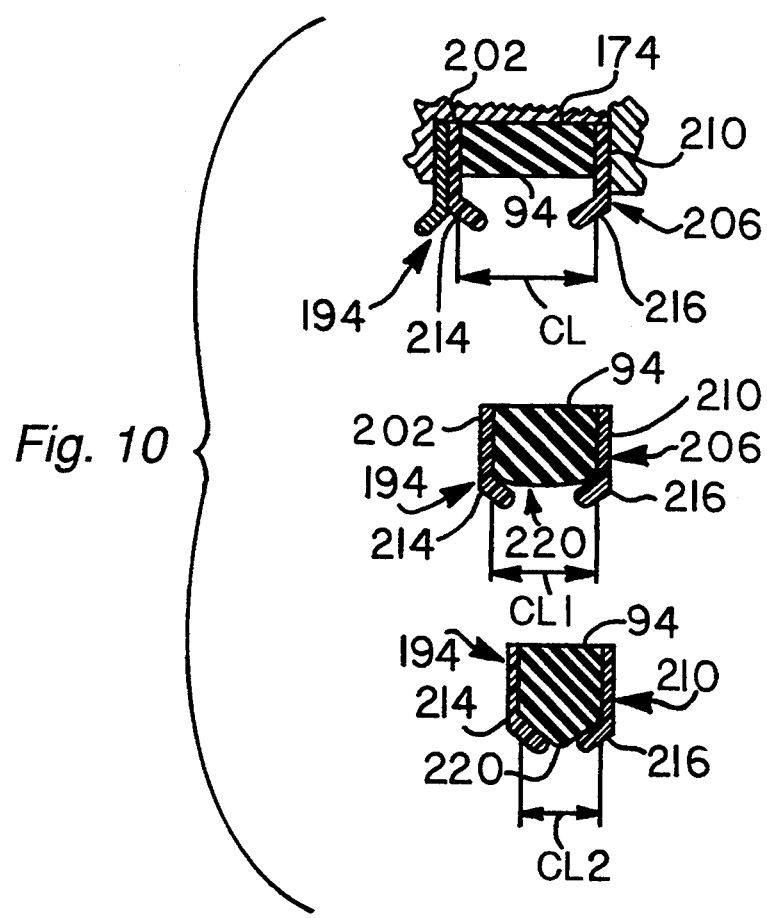
FIG. 10 is a schematic cross-section of the spring compression process according to this invention.

The spring compression process is detailed schematically in FIG. 10. The uncompressed spring 94 has a free length CL. At this time, the spring 94 is radially remote from the frustoconical walls 214 and 216 of the respective washers 194 and 206. The spring 94 subsequently becomes compressed to a length CL1. At this compression length, the spring begins to contact the frustoconical walls 214 and 216. Note that the ends of the spring 94 are held against the walls 214 and 216 but the midsection 220 of the spring 94 begins to extend radially outwardly. Finally, in an essentially maximum state of compression, in which the spring is reduced to distance CL2, the spring is almost completely encapsulated by the frustoconical walls 214 and 206 with only a small midsection 220 projecting outwardly. In this state, the spring is essentially fully compressed and only very high impact forces provide any further compression. This fully compressed state generates a third, highly damped, spring rate.

Aside from enabling multiple spring rates, the frustoconical washers 194, 204 and 206, by encapsulating each spring 92 and 94, prevent them from becoming overcompressed and potentially damaged or destroyed by extreme impacts. Thus, the frustoconical washers 194, 204 and 206 provide a safety feature that prevents "bottoming-out" of the spring beyond a predetermined point.

As detailed in FIG. 9 a further safety feature is provided by a spring 222 located within the shock absorber tube 98 adjacent the bushing 176. The spring 222, according to this embodiment, comprises a polyurethane material having plasticizers that provide the spring 222 with a resilience factor of less than twenty percent. Such material is available from a variety of commercial manufacturers upon request and other materials having similar characteristics are contemplated. The spring 222 is designed to become momentarily elastically deformed upon impact. It is sized and located so that it extends into the path of maximum travel T of the shaft 174 and end cap 182, but would rarely be contacted unless a very severe impact were encountered that would "bottom-out" the springs 92 and 94. At such time, the spring 222 becomes compressed to absorb the energy of an extreme impact. Since the impact contract of the spring 222 by the end cap 182 is infrequent and momentary, it can be constructed with plasticizers to make it highly damped. Longer periods of loading would cause the spring 222 to become plastically or permanently deformed. The cylindrical spring 222 can be substituted with a small freely floating ball 224 (shown in phantom) having a diameter DB that is greater than the distance between the maximum point of travel 226 and the bottom edge of the bushing 228. The ball 224 becomes elastically compressed to absorb extreme impacts. Such a ball can also be constructed of a highly damped elastomeric material such as polyurethane having a twenty percent or less resilience factor.

Additional safety features are provided in order to account for possible suspension or spring/shock absorber failure according to this invention. Referring to FIGS. 1, 2 and 4, one potential hazard of a suspension having upper and lower pivoting links is that failure of the spring, in which the spring "bottoms-out" completely or breaks, could cause the fork members 48 to rise upwardly and bring the wheel 114 into contact with the head tube 20 and down tube 24. This would cause an immediate jamming of the wheel that could seriously injure the rider. To prevent such an occurrence, the links and pivot points have been arranged so that the pivot shaft 134 engages the stem support 38 before the wheel contacts any of the frame elements. Accordingly, the suspension "bottoms-out" on the stem and the rider maintains full control in the event of failure.

Similarly, if the spring/shock absorber were to break or separate, the fork members 48 could pivot downwardly and around to place the wheel 114 into contact with the down tube 24. Thus, the pivot support brackets 78 (FIGS. 1 and 2) each include a shoulder 240 that extends outwardly from the face bracket 78. The shoulder interferes with a top end 242 of the lower link 62 to prevent each lower link 62 from pivoting relative to a respective fork member 48 beyond a predetermined distance. The shoulders 240 can be formed by bending a portion of the bracket 78 into a perpendicular orientation relative to the face of the bracket.

The foregoing has been a detailed description of a preferred embodiment. Various modifications and additions can be made without departing from the spirit and scope of this invention. This description is, therefore, meant to be taken only by way of example and not to otherwise limit the scope of the invention.

What is claimed is:

1. A front fork suspension system for a bicycle having a bicycle frame, a front wheel, a rear wheel and with pedals, interconnected with a rear wheel, for driving the rear wheel, the suspension system comprising:

a front fork including a pair of fork members having ends for supporting the front wheel therebetween;

a handlebar stem assembly having a steer tube rotatably mountable in a head tube of the bicycle frame and the stem assembly including, at an upper end, a forwardly-extending handlebar-supporting stem portion substantially transverse to an axis of the head tube;

an upper linkage having a first end pivotally mounted to the stem assembly and having a second end pivotally mounted to a first location on the front fork;

a lower linkage having a first end pivotally mounted to a lower end of the steer tube and having an opposing second end pivotally mounted to a second location on the front fork;

a compression spring attached between the stem assembly and the lower linkage at an attachment point on the upper linkage located substantially at the first end thereof and an attachment point at the lower linkage located substantially between the first end and the second end thereof; and the upper linkage, the lower linkage, the stem assembly and the front fork being constructed and arranged so that the wheel-supporting ends of the front fork displace in response to a force applied thereto, along a curved path, the curved path defining a path that is oriented at an acute angle at any given point therealong relative to the ground wherein a value of the acute angle continuously increases as displacement of the front fork increases "from minimum to maximum displacement", the acute angle being chosen so that a displacement of the front fork due substantially to a force pedaling motion is less than a value of the acute angle at a greater displacement of the front fork due to an applied force of an impact on the front fork by an obstruction, whereby displacement due to pedaling motion is reduced.

2. A front fork suspension as set forth in claim 1 wherein at least one of the upper linkage and the lower linkage includes an adjustment member constructed and arranged so that the acute angle of the path is variable relative to a predetermined displacement of the wheel-supporting ends.

3. A front fork suspension as set forth in claim 2 wherein the adjustment member comprises an eccentric shaft located at the second end of the upper linkage, wherein rotation of the eccentric shaft alters the location of the upper linkage relative to the front fork.

4. A front fork suspension as set forth in claim 3 wherein the eccentric shaft includes a pair of set screws located at opposing ends of the eccentric shaft for locking the eccentric shaft in a predetermined rotational orientation.

5. A front fork suspension as set forth in claim 1 wherein the compression spring comprises a first elastomeric spring mounted on a shaft.

6. A front fork suspension as set forth in claim 5 further comprising a pair of frustoconical structures located between opposing ends of the first elastomeric spring, the structures including flat surfaces engaging the ends of the spring and frustoconical walls remote from the first elastomeric spring in an uncompressed state, wherein compression of the spring due to displacement of the wheel-supporting ends causes the first elastomeric spring to expand to engage the frustoconical walls.

7. A front fork suspension as set forth in claim 6 wherein the shaft includes an axis aligned in a direction of the compression and wherein the first elastomeric spring includes an inner diameter, the outer diameter of the shaft being larger than the inner diameter of the first elastomeric spring when the first elastomeric spring is free of contact with the shaft, whereby a damping friction is generated by movement between the first elastomeric spring and the shaft when the first elastomeric spring is in contact with and mounted over the shaft.

8. A front fork suspension as set forth in claim 7 further comprising a second elastomeric spring mounted on the shaft and located adjacent to the first elastomeric spring along a direction of compression, the second elastomeric spring including frustoconical structures at opposing ends thereof, the frustoconical structures having flat surfaces engaging the ends of the second elastomeric spring and frustoconical walls remote from the second elastomeric spring in an uncompressed state, is free of contact with the frustoconical walls.

9. A front fork suspension as set forth in claim 8 wherein the second elastomeric spring includes an inner diameter that is smaller than the outer diameter of the shaft and that is different than the inner diameter of the first elastomeric spring when the second elastomeric spring is free of contact with the shaft, whereby a damping friction is generated by movement between the second elastomeric spring and the shaft when the second elastomeric spring is in contact with and mounted over the shaft, the damping friction generated by movement between the first elastomeric spring and the shaft being different than the damping friction generated by movement between the second elastomeric spring and the shaft.

10. A front fork suspension as set forth in claim 9 wherein the first elastomeric spring and the second elastomeric spring each comprise elastomeric materials having unequal durometers.

11. A front fork suspension as set forth in claim 10 wherein the durometer of the first elastomeric spring is greater than the durometer of the second elastomeric spring and the inner diameter of the first elastomeric spring is smaller than the inner diameter of the second elastomeric spring, whereby a dual spring rate is generated by the compression of a combination of the first elastomeric spring and the second elastomeric spring.

12. A front fork suspension as set forth in claim 1 wherein the compression spring comprises a first elastomeric spring and a second elastomeric spring each mounted on a shaft along a direction of compression and adjacent each other along the shaft, the first elastomeric spring having a first inner diameter and the second elastomeric spring having a second inner diameter, wherein the first inner diameter and the second inner diameter are each smaller than an outer diameter of the shaft when the first elastomeric spring and the second elastomeric spring are free of contact with the shaft and wherein the first inner diameter is less than the second inner diameter, whereby a dual damping rate is generated by a combination of the first elastomeric spring and the second elastomeric spring upon compression.

13. A front fork suspension as set forth in claim 12 wherein the first elastomeric spring comprises an elastomeric material having a first durometer and wherein the second elastomeric spring comprises an elastomeric material having a second durometer and wherein the first durometer is greater than the second durometer, whereby the combination of the first elastomeric spring and the second elastomeric spring generates a dual spring rate upon compression.

14. A front fork suspension as set forth in claim 1 wherein the upper linkage includes, at each of the first end and the second end thereof, a pivot tube.

15. A front fork suspension as set forth in claim 14 wherein each of the upper linkage and the lower linkage comprises a pair of upper links and a pair of lower links, respectively, supporting each respective pivot tube at opposing ends thereof, the upper links and the lower links each including a pinch clamp structure for rotationally securing each of the upper links and the lower links to the respective pivot tube.

16. A front fork suspension as set forth in claim 1 wherein each of the fork members comprises a tube having a cross-section that substantially defines a D-shape and wherein each of the fork members includes a flattened face, the flattened face of each of the fork members facing and defining a plane that is approximately parallel to an opposing flattened face of the other of the fork members.

17. A front fork suspension system for a bicycle comprising:
a front fork including a pair of fork members having ends for supporting a front wheel therebetween;
a handlebar stem assembly having a steer tube rotatably mountable in a head tube of a bicycle frame and including, at an upper end, a forwardly-extending handlebar-supporting stem portion substantially transverse to an axis of the head tube;
an upper linkage having a first end pivotally mounted to the stem assembly and having a second end pivotally mounted to a first location on the front fork;
a lower linkage having a first end pivotally mounted to a lower end of the steer tube and having an opposing second end pivotally mounted to a second location on the front fork;
a compression spring attached between the stem assembly and the lower linkage at an attachment point on the upper linkage located substantially at the first end thereof and an attachment point at the lower linkage located substantially between the firs end and the second end thereof;
the upper linkage, the lower linkage, the stem and the front fork being constructed and arranged so that the wheel-supporting ends of the front fork displace in response to a force applied thereto, along a curved path; and
wherein at least one of the fork members includes a stop that engages the lower linkage to prevent the front fork from extending away from the handlebar stem assembly beyond a predetermined distance.

18. A front fork suspension system for a bicycle having a frame, a front wheel, a rear wheel, and pedals for driving the rear wheel, the suspension system comprising:
a front fork including a pair of fork members having ends for supporting a front wheel therebetween;
a handlebar stem assembly having a steer tube rotatably mountable in a head tube of the bicycle frame and including, at an upper end, a forwardly-extending handlebar-supporting stem portion defining an elongated beam that is mounted to the steer tube and that extends forwardly in an elongated orientation that is substantially transverse to an axis of the head tube and that includes a handlebar mounting location being spaced from and located remote from the steer tube;
an upper linkage having a first end pivotally mounted to the handlebar-supporting stem portion at a location along the handlebar-supporting stem portion that is remote from the steer tube and the upper linkage having a second end pivotally mounted to a first location on the front fork;
a lower linkage having a first end pivotally mounted to a lower end of the steer tube and having an opposing second end pivotally mounted to a second location on the front fork;
a compression spring attached between the handlebar-supporting stem portion and the lower linkage at an attachment point on the upper linkage located substantially at the first end thereof and at an attachment point at the lower linkage located substantially between the first end and the second end thereof and the upper linkage, the lower linkage, the stem and front fork being constructed and arranged so that the wheel-supporting ends of the front fork displace in response to a force applied thereto, along a curved path and whereby force transfer from the fork members to the handlebar-supporting stem portion occurs.

19. A front fork suspension system for a bicycle having pedals for driving the rear wheel comprising:

a front fork including a pair of fork members having ends for supporting a front wheel therebetween;

a handle bar stem assembly having a steer tube rotatably mounted in a head tube of the bicycle frame;

an upper linkage having a first end pivotally mounted to the handle bar stem assembly above the head tube and a second end pivotally mounted to a first location on the front fork;

a lower linkage having a first end pivotally mounted to a lower end of the steer tube below the head tube and a second end pivotally mounted to a second location on the front fork;

a compression spring attached between the stem assembly and the lower linkage, the compression spring comprising a pair of elastomeric springs each having a respective inner diameter and each being mounted on a common shaft that is pivotally mounted between the stem assembly and the lower linkage, the shaft having a predetermined outer diameter, wherein the inner diameter of each of the elastomeric springs is different from each other and smaller than the outer diameter of the shaft so that each of the elastomeric springs generates a differing damping rate upon compression of each of the elastomeric springs whereby a damping rate of the compression spring varies based upon an amount of displacement of the compression spring.

* * * * *